United States Patent [19]
Southward et al.

[11] Patent Number: 5,627,896
[45] Date of Patent: May 6, 1997

[54] ACTIVE CONTROL OF NOISE AND VIBRATION

[75] Inventors: Steve C. Southward, Cary; Dino J. Rosetti, Raleigh; Mark R. Jolly, Holly Springs, all of N.C.

[73] Assignee: Lord Corporation, Cary, N.C.

[21] Appl. No.: 260,660

[22] Filed: Jun. 18, 1994

[51] Int. Cl.⁶ .................................................. G10K 11/16
[52] U.S. Cl. .................................................. 381/71; 381/94
[58] Field of Search .................... 381/71, 94, 73.1, 381/13

[56] References Cited

U.S. PATENT DOCUMENTS

| | | | |
|---|---|---|---|
| 4,083,433 | 4/1978 | Geohagen, Jr. et al. | 188/1 B |
| 4,122,303 | 10/1978 | Chaplin et al. | 179/1 P |
| 4,153,815 | 5/1979 | Chaplin et al. | 179/1 P |
| 4,232,381 | 11/1980 | Rennick et al. | 367/135 |
| 4,268,829 | 5/1981 | Baurle et al. | 343/100 LE |
| 4,417,098 | 11/1983 | Chaplin et al. | 381/94 |
| 4,473,906 | 9/1984 | Warnaka et al. | 381/71 |
| 4,562,589 | 12/1985 | Warnaka et al. | 381/71 |
| 4,677,676 | 6/1987 | Eriksson | 381/71 |
| 4,689,821 | 8/1987 | Salikuddin et al. | 381/71 |
| 4,736,460 | 4/1988 | Rilling | 455/283 |
| 4,878,188 | 10/1989 | Ziegler, Jr. | 364/724.01 |
| 4,931,977 | 6/1990 | Klemes | 364/581 |
| 4,939,685 | 7/1990 | Feintuch | 364/724.19 |
| 4,989,170 | 1/1991 | Batruni et al. | 364/724.19 |
| 5,058,047 | 10/1991 | Chung | 364/724.19 |
| 5,124,626 | 6/1992 | Thoen | 318/610 |
| 5,133,527 | 7/1992 | Chen et al. | 248/550 |
| 5,136,531 | 8/1992 | McCaslin | 364/724.09 |
| 5,170,433 | 12/1992 | Elliott et al. | 381/47 |
| 5,174,552 | 12/1992 | Hodgson et al. | 267/140.11 |
| 5,216,692 | 6/1993 | Ling | 375/1 |
| 5,216,722 | 6/1993 | Popovich | 381/71 |
| 5,243,624 | 9/1993 | Paik et al. | 375/14 |
| 5,259,033 | 11/1993 | Goodings et al. | 381/68 |
| 5,260,896 | 11/1993 | Iwasaki | 364/724.19 |
| 5,278,913 | 1/1994 | Delfosse et al. | 381/71 |
| 5,384,853 | 1/1995 | Kinoshita | 381/94 |

FOREIGN PATENT DOCUMENTS

0492680A2 7/1992 European Pat. Off. ....... G10K 11/16

*Primary Examiner*—Joseph Mancuso
*Assistant Examiner*—Jerome Grant, II
*Attorney, Agent, or Firm*—Randall S. Wayland; Richard K. Thomson

[57] ABSTRACT

An active system for controlling vibration or sound. The system includes a method for limiting the output gain G from a gradient descent algorithm, such as an LMS algorithm, according to the relationship $$G = \sqrt{W_0^2 + W_1^2}$$

and reducing one of first and second filter weights $W_1$ and $W_0$ such that $G \leq G_{max}$ ensuring the output canceling signal is never saturated. This eliminates the square wave shape which may impart unwanted harmonics or resonances to the dynamic system. In another aspect, the system eliminates drift of the output devices toward saturation when situations are encountered such as singularities in the quadratic performance surface. This is accomplished by applying leakage factor $r(k)$ to a function $f(k)$ at or near a predetermined limit to avoid saturation of the output device. The function $f(k)$ can be the gain G or the weights $W(k)$. Another aspect is to provide a constant, optimum, and stable adaptation rate in an LMS system by providing an optimum adaptation coefficient $\mu_{opt}$ that provides a constant, uniform, and optimum adaptation rate on a per period basis for all frequencies. Various combinations of the above are described and are useful in active control systems.

24 Claims, 4 Drawing Sheets

ACTIVE CONTROL OF NOISE AND VIBRATION

FIELD OF THE INVENTION

This invention relates to the area of active control of noise and vibration. Specifically, the invention relates to improvements in implementations of least mean square (LMS) and Filtered-x LMS algorithms for controlling active systems.

BACKGROUND OF THE INVENTION

Active vibration isolation and sound isolation systems are known in the art. These systems utilize microprocessors (processors) to control or minimize mechanical vibration or ambient noise levels at a defined location or locations. Typical examples include noise or vibration experienced in an aircraft cabin or within an automobile passenger compartment. Generally, these active systems are responsive to at least one external input signal such as a synchronizing tachometer signal and/or error signal as supplied by various types of sensors such as microphones, accelerometers, etc. Generally, these systems strive to reduce to zero or at least minimize the recurring sound and/or vibration.

Examples of such systems are taught in U.S. Pat. No. 4,677,676 to Eriksson, U.S. Pat. No. 4,153,815 to Chaplin et al., U.S. Pat. No. 4,122,303 to Chaplin et al., U.S. Pat. No. 4,417,098 to Chaplin et al., U.S. Pat. No. 4,232,381 to Rennick et al., U.S. Pat. No. 4,083,433 to Geohegan, Jr. et al., U.S. Pat. No. 4,878,188 to Ziegler, Jr., U.S. Pat. No. 4,562,589 to Warnaka et al., U.S. Pat. No. 4,473,906 to Warnaka et al., U.S. Pat. No. 5,170,433 to Elliott et al., U.S. Pat. No. 4,689,821 to Salikuddin et al., U.S. Pat. No. 5,174,552 to Hodgson, and U.S. Pat. No. 5,133,527 to Chen et al., the disclosures of each are hereby incorporated by reference herein. In these types of systems, the algorithm used for control can be least mean square (LMS), Filtered-x LMS, or the like.

In active control systems of the above-mentioned type, it is generally required to have an input signal(s) which is supplied to an adaptive filter and/or a processor which is indicative of the frequency content and/or amplitude/phase of the input source, i.e., indicative of what is causing the disturbance. Particularly, for tonal control systems it is usually required to have two or more analog or digital waveforms, such as a sine and cosine wave, that are synchronized with, i.e., at the same frequency as, the input source signal for providing the appropriate information to the processor and/or adaptive filter.

Figure 1:
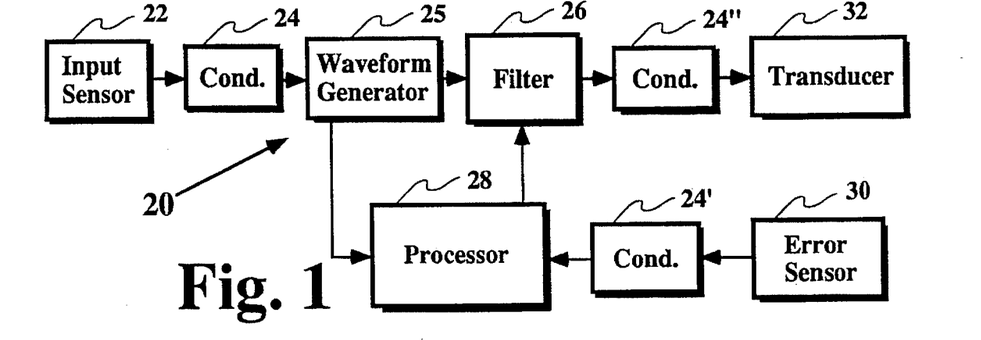
FIG. 1 is a block diagram illustrating a typical feedforward active control system.

A block diagram of a typical active control system is detailed in FIG. 1. The active control system 20 is comprised of an input source sensor 22 from which is derived a signal indicative of the source of the disturbance to be canceled, whether that disturbance is a mechanical vibration, a rotating unbalance, a source of acoustic noise, or the like. The sensor signal is conditioned by conditioner 24, such as by bandpass filtering and amplifying such that a usable signal is achieved. Conditioning of the signal may not be required as dictated by the application. The resulting signal is passed into a waveform generator 25. The waveform generator 25 provides the appropriate synchronized waveforms to the processor 28 and the adaptive filter 26.

For tonal control or control of a single vibrational input, the waveform generator 25 generates at least two analog or digital waves, such as a sine and cosine wave, which are synchronized in frequency with the input signal. The output from the waveform generator 25 is generally input to an adaptive filter 26 and generally also fed to a processor 28 to trigger the processor to perform the appropriate calculations. The input to the filter 26 generally has the form:

$$x_k = A \sin(\omega kT) + B \cos(\omega kT)$$

where $x_k$=input signal
T=Sample period
A=Amplitude of the real portion
B=Amplitude of the imaginary portion The filter 26 output contains each of the sine and cosine components, adjusted in amplitude by the adaptive weights $W_k$. In a single input-single output (SISO) system, there is a single input $x_k$ and weights $W_0$ and $W_1$ are used to adaptively update the adaptive filter 26 in response to the error and/or input signal. The error sensor 30 provides a signal to the conditioner 24' which is indicative of the residual disturbance, i.e., the residual noise or vibration at the location of interest.

After being conditioned, the signal is inputted to the processor 28 where various calculations take place. The calculations take place according to an algorithm in order to produce updated adaptation coefficient weights. These updates to the weights occur according to an LMS algorithm, Filtered-x LMS algorithm, or the like. The output from the filter 26 is again conditioned by conditioner 24" and inputted to output device 32 to produce a output disturbance $y_k$ at the location of interest. The magnitude of the output disturbance $y_k$ in the ideal case is sufficient to minimize the mean square error $e_k^2$ at the sensor location. In other words, ideally, the error will be driven to zero.

Multiple input-multiple output (MIMO) systems are also known which utilize multiple input sensors, output devices, and error sensors. One such system is described in U.S. Pat. No. 5,216,722 to Popovich, the disclosure of which is hereby incorporated by reference herein. MIMO systems function essentially in the same fashion as SISO systems, albeit they are more computationally intensive.

Figure 2:
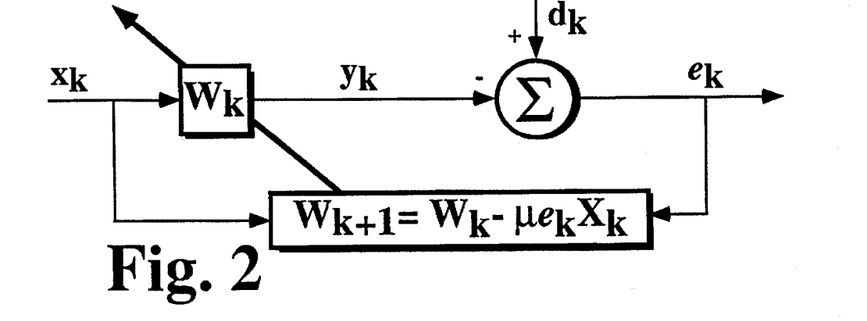
FIG. 2 is a block diagram illustrating the classical least mean square (LMS) algorithm.

In classical least mean square (LMS) control as illustrated by the block diagram of FIG. 2, an error signal $e_k$ is generated as the difference between the desired $d_k$ and the actual filter output $y_k$. In the ideal case, the error signal is zero and the filter output $y_k$ is equal and opposite to the desired $d_k$, thus completely canceling the disturbance (the vibration or sound pressure) at the predetermined location of interest. In classical LMS control, the error(s) $e_k$ and the input(s) $x_k$ are used to adaptively update the weight vector $W_k$ in a Finite Impulse Response (FIR) Filter according to the LMS algorithm. The weights are updated according to the relationship:

$$W_{k+1} = W_k - \mu e_k X_k$$

where $W_k$=adaptive filter weight
$e_k$=error signal
$X_k$=the input signal
$\mu$=the adaptation coefficient which regulates the speed and stability of adaptation The error is derived from the equation $$e_k = d_k - y_k$$

Therefore, the error becomes $$e_k = d_k - X_k^T W_k$$

where $X_k^T$=transpose of the $X_k$ vector $d_k$=desired disturbance $e_k$=error signal In most practical instances, it is desired to minimize the mean squared error (MSE) signal, i.e., the average power of the error signal. Therefore, the performance function to be minimized becomes:

$$e_k^2=(d_k+X_k^T W)^2=d_k^2+W^T X_k X_k^T W-2d_k X_k^T W$$

This equation results in a multi-dimensional plot or quadratic performance surface which generally has one or more minima, which will be illustrated later. The classical LMS algorithm is fully described by Bernard Widrow and Samuel D. Stearns, *Adaptive Signal Processing*, Prentice-Hall, 1985.

The Filtered-x algorithm is a modification of the basic feedforward LMS algorithm. This modification is required when dynamics exist between the adaptive filter output and the error sensor signals. The modification to the update equation includes an estimate of the plant transfer function $\hat{P}$. This estimate of the plant $\hat{P}$ enables the appropriate approximation of the gradient of the performance or error surface.

Figure 3:
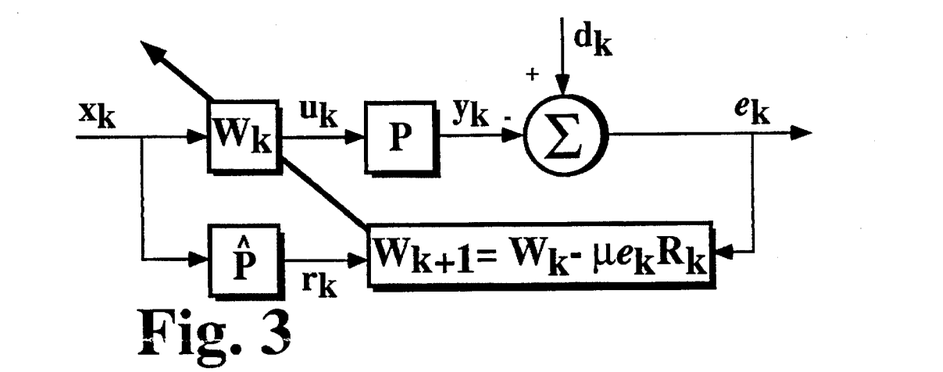
FIG. 3 is a block diagram illustrating the Filtered-x least mean square algorithm (Filtered-x LMS)

The block diagram of FIG. 3 illustrates a typical Filtered-x LMS algorithm. The major difference, as compared to classical LMS, is inclusion of plant dynamics. The plant estimate $\hat{P}$ which is obtained through a system identification (ID) step, is obtained either at startup or in an on-line fashion. The update equation for Filtered-x is given by:

$$W_{k+1}=W_k-\mu e_k R_k$$

where $R_k$=a filtered version of the input signal

Figure 3A:
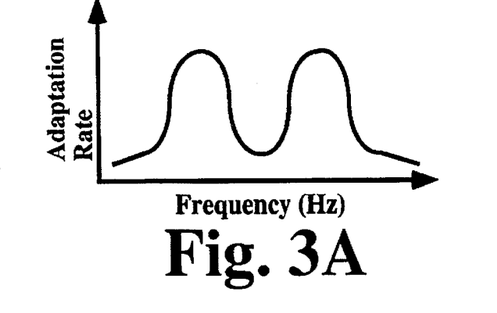
FIG. 3A is a diagram illustrating a typical adaptation rate of an LMS system as a function of frequency.

Typical implementations of the Filtered-x LMS algorithm design the adaptation coefficient μ to be stable in the worst case. This is achieved by choosing a fixed or constant value of μ which is typically very small. For a fixed value of μ, and when the plant gain is very low, the adaptation rate will also be very slow, but still stable. When the plant gain is very low, the adaptation rate was also very slow, but still stable. When the plant gain is very high, such as at a resonance peak, the adaptation rate will be correspondingly high. FIG. 3A illustrates this phenomena. Typically, the adaptation coefficient μ is frequency insensitive, i.e., it is a constant of the proper magnitude that insures stability of convergence at the worst case condition.

This illustrates one of the shortcomings of classical LMS and Filtered-x LMS algorithms. The adaptation coefficient μ is frequency insensitive. Thus, the adaptation rate must vary as a function of the frequency of the input disturbance because the plant transfer function P varies as a function of frequency. As a result of this, optimum convergence can never be achieved in these systems. U.S. Pat. No. 4,931,977 to Klemes describes a method of adaptive filtering that allows convergence in a fixed, predetermined amount of time by a Newton-method descent method, the disclosure of which is hereby incorporated by reference. Other references describing various adaptation methods are U.S. Pat. No. 5,260,896 to Iwasaki, U.S. Pat. No. 5,243,624 to Paik et al., U.S. Pat. No. 5,136,531 to McCaslin, U.S. Pat. No. 5,124,626 to Thoen, U.S. Pat. No. 5,058,047 to Chung, U.S. Pat. No. 4,989,170 to Batruni et al., U.S. Pat. No. 4,939,685 to Feintuch, and U.S. Pat. No. 4,878,188 to Ziegler, Jr.

Furthermore, under certain conditions when utilizing LMS control, the output from the digital processor to the adaptive filter can exceed the saturation limits. For example, when large disturbances are encountered. Because the filters and processors are only capable of outputting signals within predetermined operating limits or voltages, this can result in a detrimental square wave or clipped form to the filter output. Furthermore, when the output device is an actuator, operating the output device in this region may cause the actuator to overheat. Therefore, a solution to the clipping and overheating problems is needed.

Figure 3B:
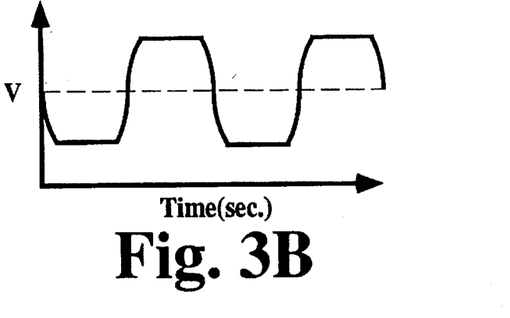
FIG. 3B is a diagram illustrating the a filter output to a output device which is saturated, i.e., which is clipped and has a square wave or near square wave shape.

FIG. 3B illustrates a typical saturated tonal waveform output. The output waveform is clipped, having a shape which approximates a square wave. Inputting this waveform into the actuator/output device can result in excitation of resonances or harmonics in the dynamic system. This is because the shape of the waveform will act as an impulsive input to the system, i.e., very similar to a hammer strike input which has a tendency to excite many resonant frequencies or modes. Furthermore, simply operating the output device in its nonlinear region may excite multiple harmonics. U.S. Pat. No. 4,736,460 to Rilling, U.S. Pat. No. 5,259,033 to Goodings et al., U.S. Pat. No. 5,216,692 to Ling, U.S. Pat. No. 4,268,829 to Baurle et al. all describe various methods of controlling signal amplitude and signal power levels.

Another problem with these active control systems utilizing LMS control is that the performance surface can contain singularities. Singularities can create serious performance problems when adaptive feedforward algorithms such as Filteredox LMS are used in MIMO systems. It is generally assumed that the quadratic performance surface, upon which the gradient based algorithms are based, has a global minimum. However, when there is no one local minima on the performance surface, a singularity exists.

Figure 4A:
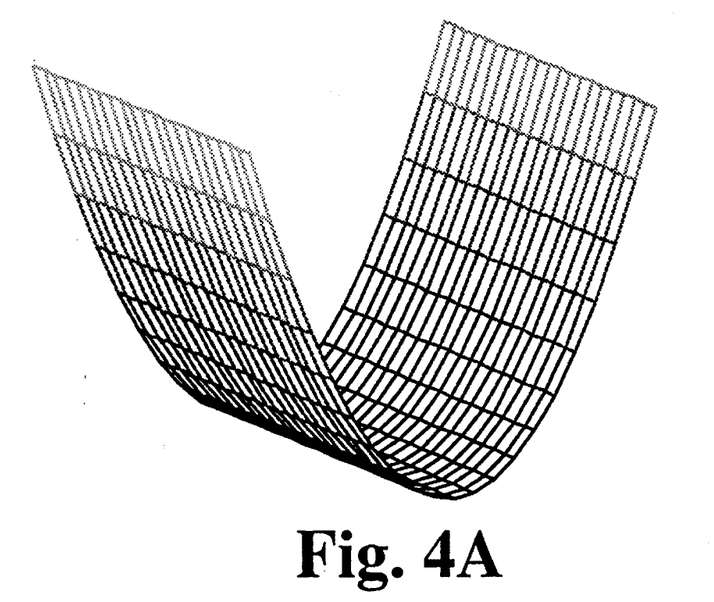
FIG. 4A is a diagram illustrating a quadratic performance surface with no one localized minima, i.e., a trough.
Figure 4B:
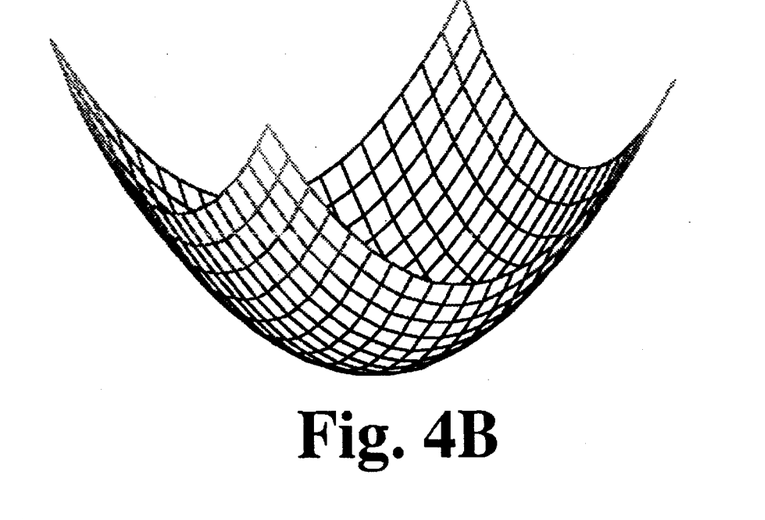
FIG. 4B is a diagram illustrating a quadratic performance surface with a global minima.

FIG. 4A illustrates such a situation where there are multiple local minima or a trough in the quadratic performance surface. FIG. 4B illustrates a typical system with only one minima. When there is a global minima, the control system will be easily converged to minimize the mean square error (MSE) using LMS, Filtered-x LMS, or the like. However, where there is no one unique minima, but several minima, or a trough as shown in FIG. 4A, the system output may become saturated. Because of inaccuracies in the plant estimates which affect the gradient estimate, as well as certain kinds of noise, the output device signals $u_k$ may drift toward the saturation limits when a singularity condition is encountered. Therefore, this situation will impart unwanted harmonics into the system. These harmonics are caused by signal clipping and from operating within the nonlinear working region of the output device. Therefore, there is a need for a method of compensating for singularity conditions. One method of preventing overdrive of a transducer is provided in U.S. Pat. No. 5,278,913 to Delfosse et al.

SUMMARY OF THE INVENTION

The present invention provides a control algorithm where constant and optimal convergence is achieved by supplying an adaptation coefficient $\mu_{opt}$ which varies in a calculated manner as a function of frequency and which results in an optimum, uniform, and constant adaptation or convergence rate. This method results in the minimum convergence time for the active noise or vibration control system.

In another aspect, the output from the adaptive LMS algorithm is gain limited according to the calculated relationship:

$$G = \sqrt{W_0^2 + W_1^2} \quad .$$

Gain limiting the output from the processor ensures the stability of the active control system by ensuring the output from the LMS controller will not be saturated, i.e., the output does not have, or will not cause, a square wave or near square wave shape which may impart harmonics or excite resonances in the dynamic system. Generally, one or more of the weights $W_0$ or $W_1$, preferably in an equal fashion, are reduced in magnitude in order to stabilize the value of gain G below a preselected threshold value of $G_{max}$.

It is a further aspect of the invention to control the drift of the output device toward the saturation limits when singularities are encountered in the quadratic performance surface and other like conditions by applying leak factor r(k) as a function of f(k), where f(k) is a function of the weights W(k) or the gain G, where k represents a discreet time sample index. Applying leakage will urge the output device away from the saturation limits.

It is a further aspect of the invention to control the drift of the output device toward saturation when singularities are encountered in the quadratic performance surface, and in combination, provide constant and optimal convergence by making the adaptation coefficient $\mu_{opt}$ vary in a calculated manner as a function of frequency. Thus, a constant adaptation or convergence rate is achieved and at the same time, a leakage factor r(k) which is a function of the filter weights W(k) or gain G is applied to urge the system away from the saturation limits by a increasing the leakage factor r(k) above a threshold preselected value of $\alpha$. This combination results in no degradation to system performance while at normal operating conditions and implements leak only above a preselected threshold level $\alpha$ while at the same time ensuring optimal convergence rate by providing an optimum adaptation coefficient $\mu_{opt}$ for each frequency bin.

In another aspect, the output from the adaptive LMS algorithm is gain limited according to the calculated relationship:

$$G = \sqrt{W_0^2 + W_1^2} \quad .$$

and, in combination, constant and optimal convergence is achieved by making the adaptation coefficient $\mu_{opt}$ vary in a calculated manner as a function of frequency. Thus, optimal adaptation is achieved while maintaining the system gain G below a preselected limit $G_{max}$ such that the system never exceeds the saturation limits and/or is never operated within the nonlinear region of the output device.

It is an advantage of the present invention that the adaptation or convergence rate of the LMS algorithm is constant irregardless of frequency of input, thus minimizing the convergence time by providing an optimal convergence coefficient $\mu_{opt}$.

It is another advantage of the present invention that the algorithm output is stabilized before the physical system has exceeded the saturation limits by limiting the gain G of the system. This ensures that square wave like shapes are not inputted to the output device which may excite system resonances/modes or other system harmonics.

It is a further advantage of the present invention that the gain G of the system is limited above a predetermined level such that the electrical current provided to a output device, such as in an active mount or structural actuator, is limited. This prevents overheating of the output device, thus enhancing reliability and durability.

It is a further advantage of the present invention that the leak is increasingly applied above a predetermined level such that the output device is urged away from the saturation limits. This method has the advantage that leak is only applied near the saturation limits. Thus, control is not compromised for normal operating conditions.

It is a further advantage that the gain G of the system is limited to avoid exceeding the saturation limits while providing an optimum and constant convergence rate as a function of frequency.

The above-mentioned and further novel aspects and advantages of the present invention will become apparent from the accompanying descriptions of the preferred embodiments and attached drawings.

BRIEF DESCRIPTION OF THE DRAWINGS

The accompanying drawings which form a part of the specification, illustrate several embodiments of the present invention. The drawings and description together, serve to fully explain the invention. In the drawings.

DETAILED DESCRIPTION OF THE INVENTION

Figure 5:
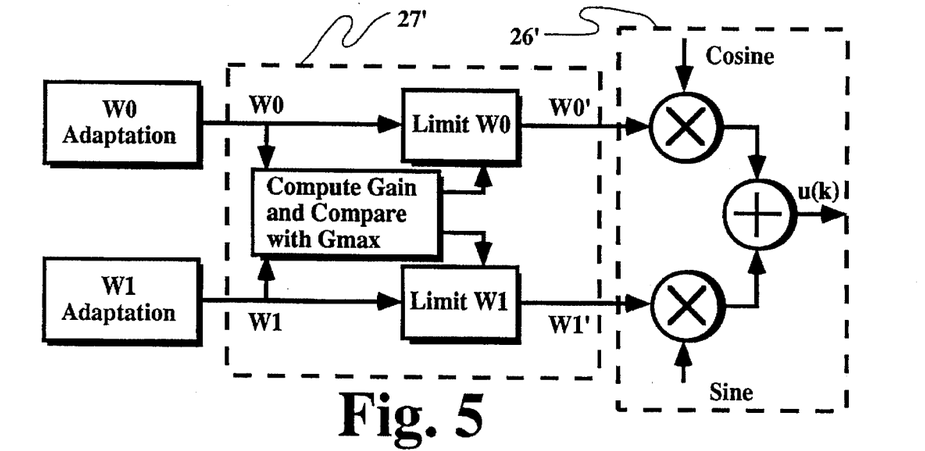
FIG. 5 is a block diagram graphically illustrating gain limitation by adjusting weights $W_0$ and $W_1$ in a SISO system.

In the following, it should be understood that the present invention is useful for controlling acoustic vibrations in air as well as mechanical vibrations in gases, liquids, or solids. FIG. 5 illustrates an aspect of the present invention where the adaptive filter weights are calculated and gain limited in such a manner so as to provide a signal u(k) to the output device (not shown) that is not saturated, i.e., gain limited such that the output falls inside the saturation limits. The weights $W_0'$ and $W_1'$ are used to update the adaptive filter.

$W_1$ is the first filter weight coefficient which is multiplied with the sine component from the waveform generator and $W_0$ is the second filter weight coefficient which is multiplied with the cosine component from the waveform generator. The multiplication takes place in block 26' representing an adaptive filter. The output from the adaptive filter is given by:

$$u(k) = W_0 \cos(\omega kT) + W_1 \sin(\omega kT)$$

The same equation may also be expressed as:

$$u(k) = G \cos(\omega kT + \phi)$$

where G is the amplitude or gain of the output u(k). The gain G is calculated according to the equation:

$$G = \sqrt{W_0^2 + W_1^2}.$$

Reducing $W_0$ and $W_1$ when the gain G is greater than a preselected threshold value of $G_{max}$ ensures that the output to the adaptive filter never exceeds the saturation limits.

The gain limitation calculation takes place in the processor and is simulated in a gain computation block 27'. The weights $W_0'$ and $W_1'$ are not released to the adaptive filter until the gain G meets the requirement of the equation:

$$G \leq G_{max}.$$

Exceeding $G_{max}$ will produce a recurring signal which is saturated to some extent. This is because most control systems include electronic devices such as Digital-to-Analog (D/A) converters and analog filters. This devices act as saturation blocks and can only output voltages within a certain range based inherently on the electronic device design. Exceeding the voltage output will clip the device output. Although this is crude form of gain limitation, it may impart an undesirable square wave shape to the output signal. This is undesirable as it may excite the harmonics, modes, or other system resonances. Because of its shape, the signal will act as an impulse function, somewhat like a hammer tap exerted on a dynamic system. The impulse may excite multiple resonances or harmonics in the system as the impulse function contains broad frequency content and may contain enough power at any one frequency to elicit a system response.

The present invention limits the gain G before the signal enters the saturation block. The value of $G_{max}$ would be predetermined by system testing and would represent a value just below the saturation point of the system output. At least one of the weights $W_0$ and $W_1$ are reduced until G is less than or equal to $G_{max}$. In this manner, the output is never saturated, because with proper selection of $G_{max}$, the output device will never be sent a square wave shape or operate within the nonlinear range of the output device. Preferably both $W_0$ and $W_1$ are reduced equally.

The gain limitation method is used in a system for reducing the magnitude of a disturbance at a selected location or locations. Generally, the localized disturbance has been generated by a source of disturbance, i.e., a rotating unbalance, exhaust noise, propeller wash, or by any other noise or vibration sources. A signal is extracted from the source that is indicative of the characteristics of the source. This may include frequency, amplitude or phase information, as may required for the processor or waveform generator.

For a finite impulse response (FIR) implementation, a series of waves are input into an adaptive filter as supplied by a waveform generator, or if a digital implementation is used, then as supplied by the processor. Either the processor or the waveform generator converts the signal indicative into a series of waves. These series of waves are generally a sine and cosine waves which are synchronized with the source of disturbance. The series of waves are then inputted to an adaptive filter.

The first and second filter weight coefficients $W_1$ and $W_0$ are calculated according to a gradient descent method such as an LMS algorithm, Filtered-x LMS algorithm, or the like. The filter weights $W_1$ and $W_0$ are generally responsive to at least one error signal and/or input signal. The output gain G is then calculated according to the abovementioned equation. If the gain exceeds $G_{max}$, then one or more of the filter coefficients $W_0$ and $W_1$ are reduced until G is less than or equal to $G_{max}$. This results in an output from the processor, and thus, out of the adaptive filter which is gain limited such that the output does not exceed the saturation limits. In essence, the output cannot have a clipped form because of the implementation of gain limitation.

The filter weight coefficients $W_0$ and $W_1$ are applied, and operate on the series of waves, and as a result, generate a canceling signal u(k) which is supplied to a output device. The output device could be at least one of an electromagnetic actuator, piezoelectric actuator, hydraulic actuator, and a loudspeaker or other like device for providing a canceling disturbance at the at least one selected location. The result is that the active control system outputs can never extend beyond the prescribed saturation limits. It should be understood that infinite impulse response (IIR) implementations could also utilize the gain limitation method. However, the gain equations would be more complicated.

Figure 6:
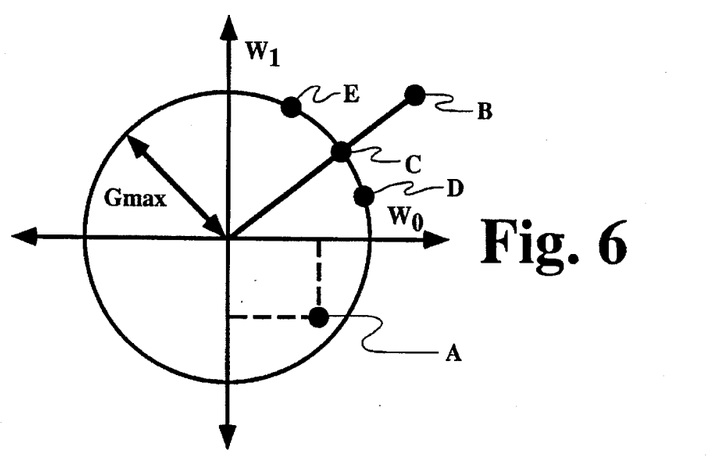
FIG. 6 is a diagram graphically illustrating methods of reducing $W_0$ and $W_1$ by gain limitation to make sure $G_{max}$ is not exceeded.

FIG. 6 graphically illustrates gain situations that are acceptable and unacceptable for the gain limitation method. The maximum allowable gain G is represented by a circle having a radius equal to $G_{max}$ within the $W_1$, $W_0$ plane. Location A represents a situation where the values of filter weights $W_1$ and $W_0$ will result in a value of G which is less than $G_{max}$. Thus, neither $W_1$ or $W_0$ would need to be adjusted and the weights would be passed to the filter without change. Location B represents a situation where the values of $W_1$ and $W_0$ will result in a value of G which is greater than $G_{max}$. Therefore, one of weights $W_1$ and $W_0$ need to be reduced to bring G to or within the circle defined by $G_{max}$. Reducing $W_1$ and $W_0$ in equal proportions will result in a gain G at location C. Reducing $W_1$ more than $W_0$ will result in a gain G at location at D. Similarly, reducing $W_0$ more than $W_1$ will result in a gain G at location at E. Location C represents the new optimal solution that is stable and gain limited. This solution C is preferred because it contains the same phase angle as the solution B which is outside the $G_{max}$ circle.

Figure 7:
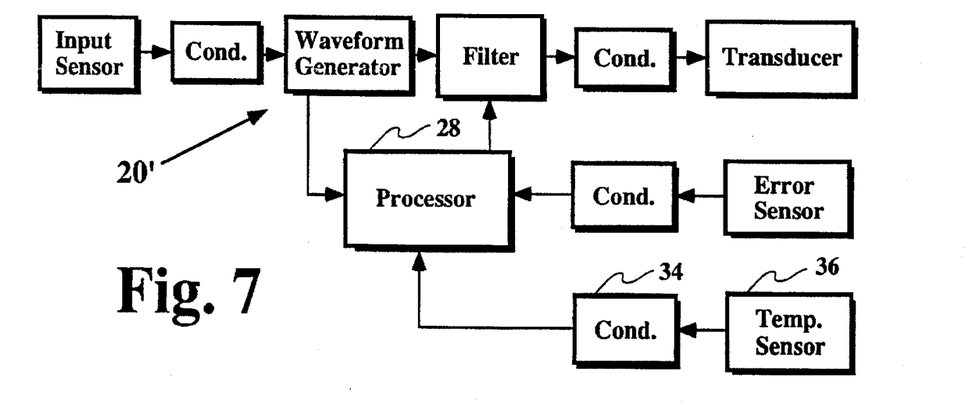
FIG. 7 is a block diagram illustrating an active system which utilizes gain limitation to stabilize temperature T below $T_{max}$.

FIG. 7 illustrates an active control system 20' which is similar to the system shown in FIG. 1 except that it incorporates gain limitation in order to ensure that a predetermined temperature $T_{max}$ of the output device is not exceeded. One of the problems associated with active control systems is that the actuators/mounts/output devices may get hot under certain conditions, such as when extreme vibrational environments are encountered wherein the actuators are operating at or near peak stroke conditions for extended periods of time. Heat is internally developed within the mounts/actuators due to resistive heating of the coils/elements within the active amounts/actuators and the like.

It is an aspect of the present invention to reduce the gain G below $G_{max}$ when a condition is encountered where the instantaneous temperature T exceeds a predetermined threshold temperature value $T_{max}$. This allows the system to avoid an overheating condition which likely will affect system life, reliability, and linearity. As illustrated in FIG. 7, the temperature information is provided to the processor 34 by sensor 36 such as a thermister or the like.

As mentioned above, in classical LMS or Filtered-x LMS algorithms, the adaptation rate μ is frequency dependent, and thus, the convergence rate can never be optimal. This aspect of the present invention overcomes this previous limitation and provides uniform, constant, and optimum convergence rate at every frequency bin.

In any practical controller, the frequency range that can be implemented is usually limited. The working frequency range is divided into a consecutive number K of frequency bands or intervals known as frequency bins. The center of each frequency bin is used to evaluate the plant transfer function P for the entire band, thus, providing an estimate of the transfer function for that bin. The real and imaginary coefficients for the real and imaginary matrices RE[i] and IM[i] for each frequency bin are obtained by a system identification (ID) process. This process is usually a sine sweep of frequency with a known sinusoidal input and the response thereto being recorded. The resulting plant transfer function can be stated as:

$$P(j\omega_i) = RE[i] + jIM[i]$$

for i=1,2,3, ... ,K
where $P(j\omega_i)$=Plant transfer function for each frequency bin For single input, single output (SISO) systems, the RE[i] and IM[i] are vectors. For multiple input, multiple output (MIMO) systems, RE[i] and IM[i] are matrices having the N by M dimensions. Where N is the number of output devices and M is the number of sensors. The equation describing the plant transfer function for a MIMO system is as follows:

$$P(j\omega_i) = RE[i] + jIM[i] \text{ for } \begin{cases} a = 1, \ldots, N & \text{output devices} \\ s = 1, \ldots, M & \text{sensors} \\ i = 1, \ldots, K & \text{frequency intervals} \end{cases}$$

where a=Output device index s=Sensor index

N=Number of output devices

M=Number of sensors

All of the following methods will preserve the estimated phase angles of the plant transfer functions and only the magnitudes will be adjusted to achieve the optimum convergence. The following update equation was generally developed by Elliott, et al. for the Filtered-x LMS algorithm in a paper by Elliott, S. J., Stothers, I. M., and Nelson, P. A., 1987, entitled "A Multiple Error LMS Algorithm and Its Application to the Active Control of Sound and Vibration," IEEE Transactions on Acoustics, Speech, and Signal Processing, Vol. ASSP-35, No. 10, pp. 1423, 1434.

$$W0^a_{k+1} = W0^a_k + \mu \sum_{s=1}^{M} E_k^s R0_k^{as}$$

$$W1^a_{k+1} = W1^a_k + \mu \sum_{s=1}^{M} E_k^s R1_k^{as}$$

for $\begin{cases} a = 1, \ldots, N \\ s = 1, \ldots, M \end{cases}$

Note that the Elliott et al. implementation includes a single adaptation coefficient μ for each output device, sensor, and frequency.

In a key aspect of the present invention, rate selection schemes are implemented to provide frequency dependent adaptation coefficients $\mu_{opt}$ to provide constant, uniform, and optimum convergence rate as a function of frequency.

Before the rate selection schemes are performed, however, it is desirable, but optional, to prefilter the MIMO RE[i] and IM[i] matrices according to one of a $TFG_{min}$ comparison method and a reconstructed G* matrix method.

The $TFG_{min}$ comparison method is accomplished by choosing a minimum threshold transfer function gain $TFG_{min}$ below which all values in the gain matrix G[i] are set to zero. Then:

IF $\{(RE_{as}^2 + IM_{as}^2) < (TGFmin^2)\}$ THEN $\{RE_{as} = 0, \text{ and } IM_{as} = 0\}$ $\begin{cases} a = 1, \ldots, N \\ s = 1, \ldots, M \end{cases}$ Prefiltering will increase the numerical robustness by eliminating all the small numbers in the matrix which would result in large errors within the rate selection scheme. Furthermore, filtering out the small magnitude coefficients is desirable as they represent very "weak" coupling between the sensor-output device pairs and will only marginally affect the results.

To further reduce the computational burden, it is desirable, but optional, to further process the RE[i] and IM[i] matrices. This is accomplished by utilizing a reconstructed G* method whereby the G[i] matrix is calculated and examined for each frequency bin according to the relationship:

$$G_{as} = \sqrt{RE_{as}^2 + IM_{as}^2}$$

where:

$G_{as}$=Gain for each output device/sensor interaction $RE_{as}$=Real matrix for each output device/sensor interaction $IM_{as}$=Imaginary matrix for each output device/sensor interaction Each row in the G[i] matrix represents the transfer function magnitudes associated with a given output device and each column in the G[i] matrix represents the magnitudes associated with a given sensor. First, looking at one row of the G[i] matrix at a time, the maximum or largest value is input into its corresponding place in a new matrix G*[i]. The rest of the values in that row are then set to zero in the G*[i] matrix. Next, one column at a time, only the maximum or largest values from each column are placed in their corresponding places in the G*[i] matrix and the rest of the values in that column are set to zero within the G*[i] matrix.

The result is a matrix G*[i] which contains only the maximum values occurring within the G[i] matrix. Finally, if the value of G*[i] at any position is zero, then the corresponding RE[i] and LM[i] coefficients of the RE[i] and IM[i] matrices are made to equal zero also according to the relation:

IF $\{G^*_{as} = 0\}$ THEN $\{RE_{as} = 0, \text{ and } IM_{as} = 0\}$ $\begin{cases} a = 1, \ldots, N \\ s = 1, \ldots, M \end{cases}$ It should be noted that terms that are non-zero may be made to equal zero by the two prefiltering methods described, i.e., the $TFG_{min}$ comparison method and reconstructed G* method. The key advantage of the reconstructed G* method of prefiltering is that the dominant coupling need not be known in advance. Furthermore, this method automatically handles the case where the dominant coupling changes with frequency.

Once these optional prefiltering steps have taken place the rate equalization scheme or gain limitation scheme may be implemented to arrive at a constant, uniform, and optimum convergence rate and/or gain limitation. Rate equalization is useful for use with a method of controlling a disturbance at at least one selected location which is generated by a source of disturbance.

Typical systems extract a signal indicative of the characteristics of said source of disturbance, convert that signal into a series of analog waves, or approximates of analog waves, and input the waves to an adaptive filter. Within the processor, the optimum convergence coefficient $\mu_{opt}$ is calculated. First, the maximum adaptation coefficient $\mu_{max}$ is calculated according to the relation:

$$\mu_{max}(\omega) = \left( \frac{2}{\|P(j\omega_i)\|^2} \right) \cong \left( \frac{2}{RE[i]^2 + IM[i]^2} \right)$$

Next, the optimal adaptation coefficient $\mu_{opt}$ is calculated according to the relationship:

$$\mu_{opt}(\omega) = \mu_{max}(\omega) \cdot \beta(\bar{N})$$

where $$\beta(\omega_0) = \tan^2\omega_0 \left[ \frac{1}{\sin\omega_0} - 1 \right]$$

and $$\omega_0 = \frac{2\pi}{\bar{N}}$$

where $\beta(\omega_0)$=scale factor $\omega$=circular frequency corresponding to the disturbance $\bar{N}$=# of samples/period $\mu_{opt}$ is calculated by the processor and represents an optimum adaptation coefficient which will provide optimum convergence for the active control system for each frequency bin. Furthermore, it should be recognized from the above equations that the optimum convergence coefficient is frequency dependent. As the plant transfer function P varies in frequency, so should $\mu_{opt}$ in order to provide optimal convergence at each frequency bin.

In order to accommodate the frequency dependent $\mu_{opt}$ within the update equation, the function $\mu_{opt}$ may be incorporated into, blended with, or absorbed into the R matrix within the MIMO system. The new weight update equations become:

$$W0_{k+1}^a = W0_a^k + \sum_{s=1}^{M} E_k^s \hat{R0}_k^{as}$$

$$W1_{k+1}^a = W1_a^k + \sum_{s=1}^{M} E_k^s \hat{R1}_k^{as}$$

$$\begin{cases} a = 1, \ldots, N \\ s = 1, \ldots, M \end{cases}$$

where $$\hat{R0}_k^{as} = \hat{RE}_{as} C_k + \hat{IM}_{as} S_k$$

$$\hat{R1}_k^{as} = \hat{RE}_{as} S_k + \hat{IM}_{as} C_k$$

$$\begin{cases} a = 1, \ldots, N \\ s = 1, \ldots, M \end{cases}$$

Figure 8:
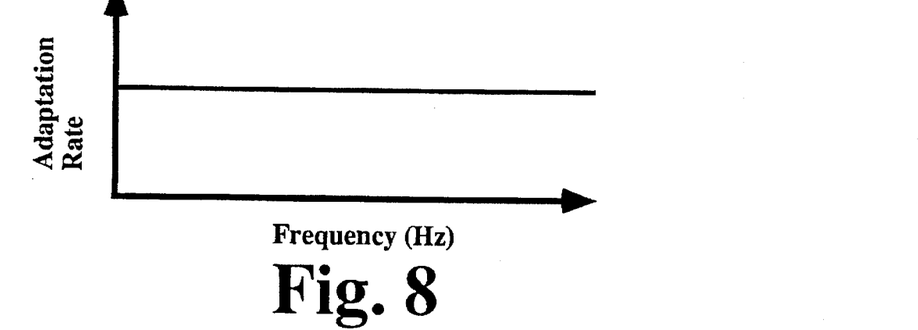
FIG. 8 graphically illustrates an optimum and constant adaptation rate as a function of frequency.

Note that the coefficient $\mu_{opt}$ has been absorbed into the real and imaginary RE and IM terms to derive the modified real and imaginary coefficients $\hat{RE}_{as}$ and $\hat{IM}_{as}$. The as subscripts denote output device/sensor pairs. The modified real and imaginary coefficients $\hat{RE}_{as}$ and $\hat{IM}_{as}$ are used to calculate the modified response vectors $\hat{R0}_k^{as}$ and $\hat{R1}_k^{as}$. The summation expressed above includes a measure of the gradient of the quadratic error surface. The weight update equation may be expressed in general terms as:

$$W(k+1) = W(k) + \mu_{opt} \nabla_k$$

where $W(k)$=adaptive filter weight coefficient $\mu_{opt}$=optimum adaptation coefficient $\nabla_k$=gradient estimate of the quadratic performance surface Once the weights are calculated, they are inputted into an adaptive filter and the filter supplies a canceling signal to a output device for controlling the disturbance. It should be noted, that this convergence rate equalization method causes an adaptation rate for the active control system that is constant with respect to frequency as illustrated by FIG. 8.

There are two methods of absorbing the frequency dependent coefficients $\mu_{opt}$ into the real and imaginary matrices RE[i] and IM[i], thus deriving or resulting in the new real and imaginary coefficients, $\hat{RE}_{as}$ and $\hat{IM}_{as}$. This is achieved by calculating according to one of an equalization and a normalization process.

In the equalization process, each of the real $RE_{as}$ and imaginary $IM_{as}$ coefficient pairs are scaled by a positive constant according to the relation:

$$\hat{RE}_{as} = \left( \frac{2\beta}{J_a} \right) \cdot \left( \frac{RE_{as}}{RE_{as}^2 + IM_{as}^2} \right)$$

$$\hat{IM}_{as} = \left( \frac{2\beta}{J_a} \right) \cdot \left( \frac{IM_{as}}{RE_{as}^2 + IM_{as}^2} \right)$$

$$\begin{cases} a = 1, \ldots, N \\ s = 1, \ldots, M \end{cases}$$

where $J_a$=Number of non-zero transfer functions for a given output device at a given frequency Non-zero optionally refers to coefficients of the transfer functions whose magnitudes are less than $TFG_{min}$ such as when the aforementioned $TFG_{min}$ comparison pre-filtering step is utilized or when the reconstructed G* method is used. Since both coefficients $RE_{as}$ and $IM_{as}$ are scaled by the same constant, the phase information is preserved. Equalization here refers to equalizing the effect of each sensor on a given output device. The equalization method is best suited for systems with a single output device and multiple sensors.

The second method of rate equalization is best described as normalization. The normalization process will provide rate equalization but it will not attempt to equalize the effect of each sensor on a given output device. In this method, the coefficients are normalized with respect to the maximum gain of all the sensor transfer functions for a given output device, according to the relation:

$$\hat{RE}_{as} = \left( \frac{2\beta}{J_a} \right) \cdot \left( \frac{RE_{as}}{G_a^2} \right)$$

$$\hat{IM}_{as} = \left( \frac{2\beta}{J_a} \right) \cdot \left( \frac{IM_{as}}{G_a^2} \right)$$

$$\begin{cases} a = 1, \ldots, N \\ s = 1, \ldots, M \end{cases}$$

where $$G_a{}^s = \max_{s=1,M} \{RE_{as}^2 + IM_{as}^2\} \quad a = 1, \ldots, N$$

Both of these methods offer key advantages in that the optimum convergence rate is automatically selected.

In this aspect of the present invention, a different adaptation coefficient $\mu_{opt}$ must be used for each frequency bin. Thus, by utilizing the above scheme, as the plant transfer function varies as a function of frequency, so does the optimum adaptation coefficient $\mu_{opt}$. This insures that the adaptation rate is constant for all frequencies. In one implementation, the convergence rates are equalized on a per-period basis. However, they could be equalized on a time constant basis, as well.

Figure 9:
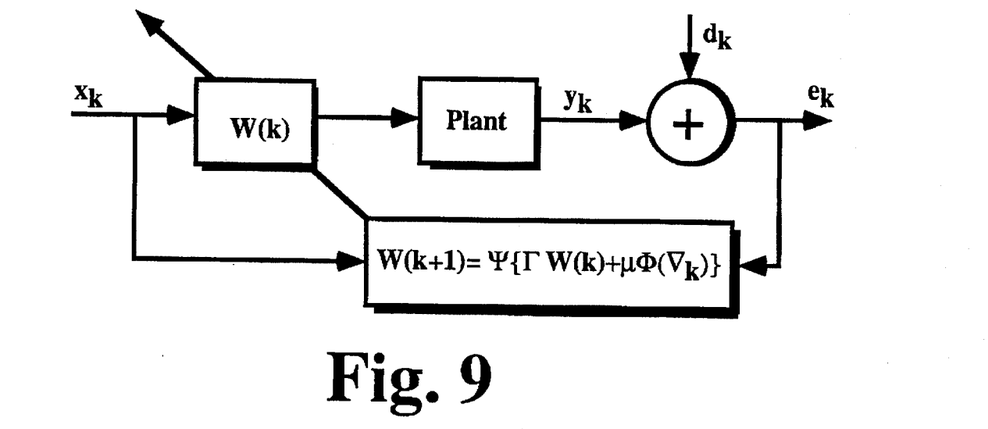
FIG. 9 is a block diagram graphically illustrating a weight update law with factors for limiting the gain, providing constant adaptation rate, and for compensating for singularities.

FIG. 9 illustrates a block diagram of a system illustrating the update equation which allows for adjusting the revised filter weights W(k+1) according to the relationship:

$$W(k+1) = \psi\{\Gamma(W_k) + \mu\Phi(\nabla_k)\}$$

where $\psi$=Function allowing Gain Limitation
$\Gamma$=Function which compensates for Singularities
$\Phi$=Function allowing Adaptation Rate optimization
$\nabla_k$=Estimate of the gradient This update law is useful for implementing the previously mentioned gain limitation, adaptation rate equalization, and compensating for singularities (to be described later) in various combinations. Combinations of only $\Phi$ and $\psi$, only $\Phi$ and $\Gamma$, are desired in most systems and may be implemented.

It should be understood that in most practical systems, it is desirable to provide both rate equalization and gain limitation of some form. For example, a combination of gain limitation and rate equalization would be implemented according to the relation:

$$W_{k+1} = \psi\{(W_k) + \mu\Phi(\nabla_k)\}.$$

Further, implementations of rate equalization and singularity compensation are possible as well, and would be implemented according to the relation:

$$W_{k+1} = \{\Gamma(W_k) + \mu\Phi(\nabla_k)\}.$$

Generally gain limitation and singularity compensation would not be implemented separately as both methods are ultimately used to adjust the gain. Typically, one or the other would be used, but not both.

When a singularity is encountered, as mentioned above, the output device signal may drift toward the saturation limits. To solve this problem, a leakage factor r(k) is applied to the weights W(k) as a function of f(k) such that when the function f(k) approaches a predetermined functional value $f_{max}$, then the leakage factor r(k) is increased according to an update equation. By increasing the leakage factor r(k) as a function of f(k), the output device is maintained within operating limits, i.e., a saturation condition cannot occur. The function f(k) may be the gain G or the weight W(k). The key being that the leakage factor r(k) is adjusted according to the function f(k) such that the leakage is applied before the signal is inputted to the adaptive filter. The weight update equation used is:

$$W(k+1) = (1-\mu r(k))W(k) - \mu\nabla(k)$$

where

Figure 10:
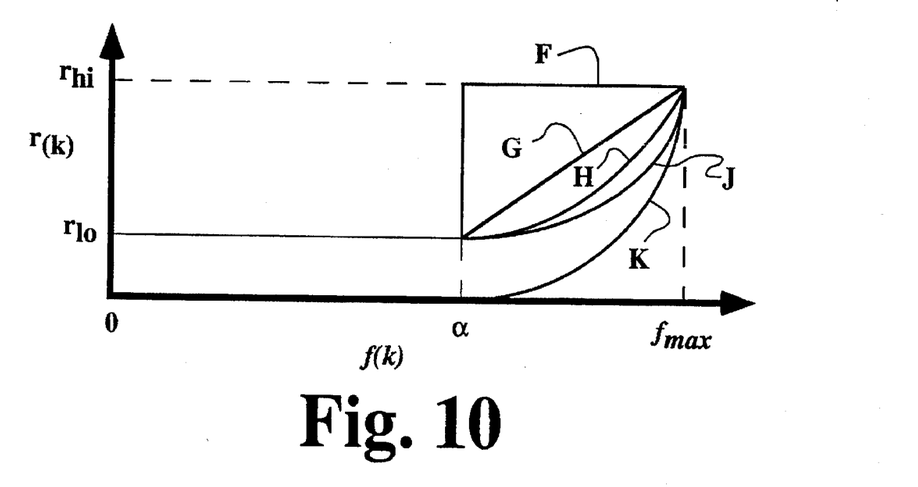
FIG. 10 graphically illustrates various methods of providing leak to the filter weights.

W(k+1)=revised filter weights
W(k)=Filter weight from a previous time step
r(k)=leakage factor
$\mu$=adaptation coefficient
$\nabla(k)$=gradient estimate It is notable that this method only applies leak when a condition is present where the output device may be exposed to a clipped signal or operated in a nonlinear portion of its stroke. Therefore, the system is not exposed to leak when normal operating conditions are present. As a result, performance is not compromised. The leakage factor r(k) may be implemented in a multitude of fashions, such as step-wise, linear, and non-linear. FIG. 10 graphically depicts the various leakage options. One possible method which is depicted by reference letter F of FIG. 10 is to let the leakage be updated in a stepwise fashion:

$$r(k) = r_{lo} \text{ when } 0 < f(k) \leq \alpha$$

and $$r(k) = r_{hi} \text{ when } \alpha < f(k) \leq f_{max}.$$

where $\alpha$=a predetermined value of f(k) between zero and $f_{max}$
$f_{max}$=a maximum value of the function Another possible method which is depicted by reference letter G of FIG. 10 is to allow the leakage factor to be updated according to the linear relationship:

$$r(k) = r_{lo} \text{ when } 0 < f(k) \leq \alpha$$

and $$r(k) = \beta_2\{f(k) - \alpha\} + r_{lo} \text{ when } \alpha < f(k) \leq f_{max}$$

where $$\beta_2 \leq \frac{1}{\mu(1-\alpha)f_{max}}$$

and $\beta_2$=an adjustment parameter

The parameter $\alpha$ may be set near where the output device begin to operate in a non-linear fashion. The adjustment parameter can be used to adjust the slope or curvature and can be chosen such that r(k) reaches a maximum value at or near the saturation limit $f_{max}$. Care must be taken when choosing $\beta$ to maintain stability of the system. For example, care must be taken to insure that the function 1-$\mu$r(k) remains positive.

Yet another method which is depicted by reference letter H of FIG. 10 is to allow the output device weight to vary as a square function according to the relationship:

$$r(k) = r_{lo} \text{ when } 0 < f(k) \leq \alpha$$

and $$r(k) = \beta_3\{f(k)^2 - (\alpha)^2\} + r_{lo} \text{ when } \alpha < f(k) \leq f_{max}$$

where $\beta_3$=an adjustment parameter similar to $\beta_2$

Another method of applying the leakage factor which is depicted by reference letter J of FIG. 10 is by allowing the leakage to be adjusted by a higher order function:

$r(k)=r_{lo}$ when $0<f(k) \leq \alpha$ and $r(k)=\beta_4\{f(k)-\alpha\}^n+r_{lo}$ when $\alpha \leq f(k) \leq f_{max}$ where $\beta_4$=an adjustment parameter similar to $\beta_2$ Still another method of controlling the leakage which is depicted by reference letter K of FIG. 10 where the leakage is adjusted by an exponential function according to the relation:

$r(k)=r_{lo}$ when $0<f(k) \leq \alpha$ and $r(k)=\beta_5 \exp\{f(k)-\alpha\}$ when $\alpha<f(k) \leq f_{max}$ where $\beta_5$=an adjustment parameter similar to $\beta_2$ In summary, in one aspect, the present invention provides a method for limiting the gain G the output to the adaptive filter when a gradient descent algorithm is utilized, such that the output signal is maintained within the saturation limits. It is a further aspect that optimum, uniform, and constant convergence rate can be achieved using an LMS or Filtered-x LMS algorithm. Further yet, singularities can be compensated for by providing appropriate leakage factor r(k) to the weight update equation such that the output device is maintained within the saturation limits. It is yet another aspect to gain limit the output to the adaptive filter while, in combination, providing constant and optimal convergence rate. This can be accomplished by applying leakage factor r(k) or limiting the value of G such that G is less than or equal to a predetermined threshold value $G_{max}$, and in combination, providing an optimal adaptation coefficient $\mu_{opt}$ for each frequency bin to provide optimal convergence rate as a function of frequency.

While several embodiments of the present invention have been described in detail, various modifications, alterations, changes and adaptations to the aforementioned may be made without departing from the spirit and scope of the present invention defined in the appended claims. It is intended that all such modifications, alterations, changes and adaptations be considered part of the present invention.

What is claimed is:

1. A method of controlling a disturbance at at least one selected location which has been generated by a source of disturbance, comprising the steps of:

(a) extracting a signal indicative of tonal characteristics of said source of disturbance, (b) converting said signal indicative into a sine wave and a cosine wave;

(c) inputting said sine wave and said cosine wave into an adaptive filter:

(d) calculating a first filter weight $W_1$ and a second filter weight $W_0$ for said adaptive filter according to an algorithm such that said first filter weight $W_1$ and said second filter weight $W_0$ are responsive to at least one of said signal indicative and at least one error signal;

(e) calculating an output gain G according to the equation $$G=\sqrt{W_0^2+W_1^2} \quad ;$$

(f) reducing at least one of said first filter weight $W_1$ and said second filter weight $W_0$ if said output gain $G>G_{max}$, where said $G_{max}$ is a preselected threshold gain value, such that $G \leq G_{max}$;

(g) inputting said first filter weight $W_1$ and said second filter weight $W_0$ to said adaptive filter to operate on said sine wave and said cosine wave, and thereafter combining said sine wave and said cosine wave for generating a canceling signal; and (h) outputting said canceling signal to an output device for controlling said disturbance at said at least one selected location and where maintaining $G \leq G_{max}$ ensures that said canceling signal exiting from said adaptive filter never exceeds a saturation limit.

2. A method of claim 1 wherein numerical robustness of a RE[i] matrix and a IM[i] matrix is increased by:

(a) calculating a gain $$G_{as}=\sqrt{RE_{as}^2+IM_{as}^2} \quad ,$$

where $RE_{as}$ is a real matrix and $IM_{as}$ is an imaginary matrix;

(b) comparing $G_{as}$ to a minimum threshold gain $TFG_{min}$; and

IF $\{(RE_{as}^2+IM_{as}^2) < (TFGmin^2)\}$THEN$\{RE_{as} = 0,$ and $IM_{as}=0\} \begin{cases} a=1,\ldots,N \\ s=1,\ldots,M \end{cases}$.

3. A method of claim 1 wherein said adaptive filter is a finite impulse response (FIR) adaptive filter.

4. A method of claim 1 wherein said algorithm is one of an LMS and a Filtered-x LMS algorithm.

5. A method of claim 1 wherein said gain G is adjusted to stabilize a temperature T below a maximum temperature value of $T_{max}$.

6. A method of claim 1 wherein said output device is one of an electromagnetic actuator, piezoelectric actuator, hydraulic actuator, and a loudspeaker.

7. A method of controlling a disturbance at at least one selected location which is generated by a source of disturbance, comprising the steps of:

(a) extracting a signal indicative of characteristics of said source of disturbance;

(b) converting said signal to a series of waves;

(c) inputting said series of waves into an adaptive filter;

(d) calculating $\mu_{max}(\omega)$, where $\mu_{max}(\omega)$ is a maximum adaptation coefficient;

(e) calculating $$\beta(\omega_0)=\tan^2(\omega_0)\left[\left(\frac{1}{\sin(\omega_0)}\right)-1\right]$$

where $\beta(\omega_0)$ is a scale factor, and $\omega_0$ is $2\pi$ divided by a number of samples per period $\overline{N}$;

(f) calculating an optimum adaptation coefficient $\mu_{opt}$ for each frequency bin according to the equation $\mu_{opt}(\omega)= \mu_{max} \cdot \beta(\omega_0)$ where $\mu_{max}$ is a function of a RE[i} matrix and a IM[i] matrix;

(g) calculating revised filter weights W(k+1) based upon the equation W(k+1)=W(k)+$\mu_{opt}\nabla_k$ where W(k) are filter weights from a previous time step and $\nabla_k$ is a measure of a gradient of a quadratic error surface;

(h) inputting said revised filter weights to said adaptive filter;

(i) outputting a canceling signal to an output device for controlling said disturbance thereby causing an adaptation rate which is constant with respect to frequency.

8. A method of controlling a disturbance of claim 7 wherein Filtered-x LMS control is used and $$\mu_{max}(\omega) = \left\{ \frac{2}{(AP(\omega_i))^2} \right\},$$

where $\mu_{max}(\omega)$ is a maximum adaptation coefficient, $P(\omega)$ is a plant transfer function, and A is the magnitude of an input $x_k$.

9. A method of controlling a disturbance of claim 7 wherein LMS control is used and $$\mu_{max}(\omega) = \left\{ \frac{2}{(A)^2} \right\},$$

where $\mu_{max}(\omega)$ is a maximum adaptation coefficient, and A is the magnitude of an input $x_k$.

10. A method of controlling a disturbance of claim 7 including the further steps of:

(a) calculating a magnitude of a gain G[i] matrix for each said frequency bin;

(b) selecting a largest value of gain G from each row of said G[i] matrix and a largest value from each column of said G[i] matrix and placing said largest values in a G* matrix, placing zeros in said G* matrix corresponding to locations of all smaller values in said rows and said columns of said G* matrix; and (c) setting all real components of said RE[i] matrix and all imaginary components of said IM[i] matrix to zero which correspond to said zero values of said G* matrix, for each said frequency bin whereby only dominant terms of said RE[i] and IM[i] matrices remain.

11. A method of controlling a disturbance of claim 7 including the further steps of:

(a) absorbing said optimum adaptation coefficient $\mu_{opt}$ into said real matrix RE[i] and said imaginary matrix IM[i] to derive modified real and imaginary matrices $\hat{RE}_{as}$ and $\hat{IM}_{as}$;

(b) calculating said modified and imaginary matrices $\hat{RE}_{as}$ and $\hat{IM}_{as}$ according to one of an equalization process and normalization process;

(c) calculating modified response vectors to be used in a first filter weight calculation according to a relationship $$\hat{R1}_k^{as} = \hat{RE}_{as}S_k - \hat{IM}_{as}C_k \text{ for } \begin{cases} a=1,\ldots,N \\ s=1,\ldots,M \end{cases} ; \text{ and}$$

(d) calculating modified response vectors to be used in a second filter weight calculation according to a relationship $$\hat{R0}_k^{as} = \hat{RE}_{as}C_k - \hat{IM}_{as}S_k \text{ for } \begin{cases} a=1,\ldots,N \\ s=1,\ldots,M \end{cases}.$$

12. A method of controlling a disturbance of claim 11 wherein said equalization process is calculated according to a relation $$\hat{RE}_{as} = \left(\frac{2\beta}{J_a}\right) \cdot \left(\frac{RE_{as}}{RE_{as}^2 + IM_{as}^2}\right)$$

$$\hat{IM}_{as} = \left(\frac{2\beta}{J_a}\right) \cdot \left(\frac{IM_{as}}{RE_{as}^2 + IM_{as}^2}\right) \quad \begin{cases} a=1,\ldots,N \\ s=1,\ldots,M \end{cases},$$

where $J_a$ is a number of non-zero transfer functions for output device $\alpha$ at a given frequency.

13. A method of controlling a disturbance of claim 11 wherein said normalization process is calculated according to a relationship $$\hat{RE}_{as} = \left(\frac{2\beta}{J_a}\right) \cdot \left(\frac{RE_{as}}{G_a^2}\right)$$

$$\hat{IM}_{as} = \left(\frac{2\beta}{J_a}\right) \cdot \left(\frac{IM_{as}}{G_a^2}\right) \quad \begin{cases} a=1,\ldots,N \\ s=1,\ldots,M \end{cases}$$

where $$G_a^s = \max_{s=1,M} \{RE_{as}^2 + IM_{as}^2\} \quad a=1,\ldots,N \text{ and}$$

where $J_a$ is a number of non-zero transfer functions for output device $\alpha$ at a given frequency.

14. A method of controlling a disturbance at at least one selected location which has been generated by a source of disturbance, comprising the steps of:

(a) extracting a signal indicative of characteristics of said source of disturbance;

(b) converting said signal indicative into a series of waves;

(c) inputting said series of waves into an adaptive filter;

(d) calculating an output gain G according to the equation $$G = \sqrt{W_0^2 + W_1^2},$$

where said $W_1$ is a first filter weight coefficient and said $W_0$ is a second weight coefficient, and reducing at least one of said first filter weight coefficient $W_1$ and said second filter weight coefficient $W_0$ if said output gain $G > G_{max}$ such that $G \leq G_{max}$;

(e) calculating $\mu_{max}(\omega)$ according to one of $$\mu_{max}(\omega) = \left\{ \frac{2}{(AP(\omega))^2} \right\}$$

when Filtered-x LMS control is utilized and $$\mu_{max}(\omega) = \left\{ \frac{2}{(A)^2} \right\}$$

when classical LMS control is utilized, where $\mu_{max}(\omega)$ is a maximum adaptation coefficient, $P(\omega)$ is a plant transfer function, and A is the magnitude of an input $x_k$;

(f) calculating $$\beta(\omega_0) = \tan^2(\omega_0) \left[ \left( \frac{1}{\sin(\omega_0)} \right) - 1 \right]$$

where $\beta(\omega_0)$ is a scale factor, and $\omega_0$ is $2\pi$ divided by the number of samples per period $\overline{N}$;

(g) calculating an optimum adaptation coefficient $\mu_{opt}$ for each frequency bin according to the equation $\mu_{opt}(\omega) = \mu_{max} \cdot \beta(\omega_0)$ where $\mu_{max}$ is a function of a real matrix RE[i] and an imaginary matrix IM[i];

(h) calculating revised filter weights W(k+1) based upon the equation $W(k+1) = W(k) + \mu_{opt} \nabla_k$, where W(k) are filter weights from a previous time step and $\nabla_k$ is a measure of a gradient of a quadratic error surface;

(i) inputting said revised filter weights W(k+1) into said adaptive filter to generate a canceling signal;

(j) outputting said canceling signal to a output device for controlling said disturbance at said selected location whereby said system is gain limited to control a saturation limit of said canceling signal and convergence occurs at an optimal and constant rate as a function of frequency.

15. A method of controlling a disturbance at at least one selected location which has been generated by a source of disturbance, comprising the steps of:

(a) extracting a signal indicative of characteristics of said source of disturbance;

(b) converting said signal indicative into a series of waves;

(c) inputting said series of waves into an adaptive filter;

(d) calculating $\mu_{max}(\omega)$ according to one of $$\mu_{max}(\omega) = \left\{ \frac{2}{(AP(\omega))^2} \right\}$$

when Filtered-x LMS control is utilized and $$\mu_{max}(\omega) = \left\{ \frac{2}{(A)^2} \right\}$$

when classical LMS control is utilized, where $\mu_{max}(\omega)$ is a maximum adaptation coefficient, $P(\omega)$ is a plant transfer function, and A is the magnitude of an input $x_k$;

(e) calculating $$\beta(\omega_0) = \tan^2(\omega_0) \left[ \left( \frac{1}{\sin(\omega_0)} \right) - 1 \right]$$

where $\beta(\omega_0)$ is a scale factor, and $\omega_0$ is $2\pi$ divided by the number of samples per period $\overline{N}$;

(f) calculating an optimum adaptation coefficient $\mu_{opt}$ for each frequency bin according to the equation $\mu_{opt}(\omega) = \mu_{max} \cdot \beta(\overline{N})$ where $\mu_{max}$ is a function of a real matrix RE[i] and an imaginary matrix IM[i];

(g) calculating revised filter weights W(k+1) based upon the equation $W(k+1) = \{1 - \mu_{opt} r(k)\} W(k) + \mu_{opt} \nabla(k)$, where W(k) are weights from a previous time step, $\nabla_k$ is a measure of a gradient of a quadratic error surface, and r(k) is a leakage factor;

(h) inputting said revised filter weights W(k+1) into said adaptive filter to generate a canceling signal;

(i) outputting said canceling signal to a output device for controlling said disturbance at said selected location; and (j) controlling said revised filter weights W(k+1) by applying leakage factor r(k) to said weights W(k) such that said leakage factor r(k) increases as a filter gain G approaches a predetermined threshold gain value of $G_{max}$ whereby convergence occurs at an optimal and constant rate as a function of frequency and said leakage factor r(k) increases as a function of said gain G to prevent said canceling signal within saturation limits.

16. A method of controlling a disturbance at at least one selected location which has been generated by a source of disturbance, comprising the steps of:

(a) extracting a signal indicative of characteristics of said source of disturbance;

(b) converting said signal indicative into a series of waves;

(c) inputting said series of waves into an adaptive filter;

(d) calculating revised filter weights W(k+1) based upon the equation $W(k+1) = \{1 - \mu r(k)\} W(k) + \mu \nabla(k)$, where $\nabla_k$ is a measure of a gradient of a quadratic error surface, r(k) is a leak factor, W(k) are weights from a previous time step, and $\mu$ is an adaptation coefficient;

(e) inputting said revised filter weights W(k+1) into said adaptive filter to generate a canceling signal;

(f) outputting said canceling signal to a output device for controlling said disturbance at said selected location; and (g) controlling said revised filter weights W(k+1) by applying leakage factor r(k) to said weights W(k) such that said leakage factor r(k) increases as a function $f(k)$ approaches a predetermined threshold value $f_{max}$ whereby said leak factor r(k) increases as a function of said function $f(k)$ to prevent said canceling signal from becoming saturated.

17. A method of controlling a disturbance of claim 16 wherein $f(k)$ is one of a gain value G(k) and a weight value W(k).

18. A method of controlling a disturbance of claim 16 wherein said output device weight $r(k) = r_{lo}$ when $0 < f(k) \leq \alpha$ and $r(k) = r_{hi}$ when $\alpha < f(k) \leq f_{max}$, where $r_{lo}$ is a low value of said leakage factor, $r_{hi}$ is a high value of said leakage factor, $f_{max}$ is a maximum value of function $f(k)$, and $\alpha$ is a preselected intermediate value of function $f(k)$.

19. A method of controlling a disturbance of claim 16 wherein said output device weight $r(k) = r_{lo}$ when $0 < f(k) \leq \alpha$ and $r(k) = \beta_2 \{f(k)^2 - \alpha\} + r_{lo}$ when $\alpha < f(k) \leq f_{max}$, where $r_{lo}$ is a low value of said leakage factor, $f_{max}$ is a maximum value of function $f(k)$, $\alpha$ is a preselected intermediate value of function $f(k)$, and $\beta_2$ is an adjustment parameter.

20. A method of controlling a disturbance of claim 16 wherein said output device weight $r(k) = r_{lo}$ when $0 < f(k) \leq \alpha$ a and $r(k) = \beta_3 \{f(k)^2 - (\alpha)^2\} + r_{lo}$ when $\alpha < f(k) \leq f_{max}$, where $r_{lo}$ is a low value of said leakage factor, $f_{max}$ is a maximum value of function $f(k)$, $\alpha$ is a preselected intermediate value of function $f(k)$, and $\beta_3$ is an adjustment parameter.

21. A method of controlling a disturbance of claim 16 wherein said output device weight $r(k) = r_{lo}$ when $0 < f(k) \leq \alpha$ and $r(k) = \beta_4 \{f(k) - \alpha\}^n + r_{lo}$ when $\alpha < f(k) \leq f_{max}$, where $r_{lo}$ is a low value of said leakage factor, $f_{max}$ is a maximum value of function $f(k)$, $\alpha$ is a preselected intermediate value of $f(k)$, and $\beta_4$ is an adjustment parameter.

22. A method of controlling a disturbance of claim 16 wherein said output device weight $r(k) = r_{lo}$ when $0 < f(k) \leq \alpha$ and $r(k) = \beta_5 \exp\{f(k) - \alpha\}$ when $\alpha < f(k) \leq f_{max}$, where $r_{lo}$ is a low value of said leakage factor, $f_{max}$ is a maximum value of function $f(k)$, $\alpha$ is a preselected intermediate value of $f(k)$, and $\beta_5$ is an adjustment parameter.

23. A method of controlling a disturbance at at least one selected location which is generated by a source of disturbance, comprising the steps of:

(a) extracting a signal indicative of characteristics of said source of disturbance;

(b) converting said signal to a series of waves;

(c) inputting said series of waves into an adaptive filter;

(d) calculating $\mu_{max}(\omega)$ according to one of $$\mu_{max}(\omega) = \left\{ \frac{2}{(AP(\omega))^2} \right\}$$

when Filtered-x LMS control is utilized and $$\mu_{max}(\omega) = \left\{ \frac{2}{(A)^2} \right\}$$

when classical LMS control is utilized, where $\mu_{max}(\omega)$ is a maximum adaptation coefficient, $P(\omega)$ is a plant transfer function, and A is the magnitude of an input $x_k$;

(e) calculating $$\beta(\omega_0) = \tan^2(\omega_0) \left[ \left( \frac{1}{\sin(\omega_0)} \right) - 1 \right]$$

where $\beta(\omega_0)$ is a scale factor, and $\omega_0$ is $2\pi$ divided by the number of samples per period $\overline{N}$;

(f) calculating an optimum adaptation coefficient $\mu_{opt}$ for each frequency bin according to the equation $\mu_{opt}(\omega) = \mu_{max} \cdot \beta(\omega_0)$ where $\mu_{max}$ is a function of a real matrix RE[i] and a imaginary matrix IM[i];

(g) absorbing said optimum adaptation coefficient $\mu_{opt}$ into said real matrix RE[i] and said imaginary matrix IM[i] to derive modified real and imaginary coefficients $\hat{RE}_{as}$ and $\hat{IM}_{as}$;

(h) calculating said $\hat{RE}$ and $\hat{IM}$ according to one of $$\hat{RE}_{as} = \left( \frac{2\beta}{J_a} \right) \cdot \left( \frac{RE_{as}}{RE_{as}^2 + IM_{as}^2} \right)$$

$$\hat{IM}_{as} = \left( \frac{2\beta}{J_a} \right) \cdot \left( \frac{IM_{as}}{RE_{as}^2 + IM_{as}^2} \right) \quad \left\{ \begin{array}{l} a=1,\ldots,N \\ s=1,\ldots,M \end{array} \right. ,$$

where $J_a$ is a number of non-zero transfer functions for output device $\alpha$ at a given frequency, and $$\hat{RE}_{as} = \left( \frac{2\beta}{J_a} \right) \cdot \left( \frac{RE_{as}}{G_a^2} \right)$$

$$\hat{IM}_{as} = \left( \frac{2\beta}{J_a} \right) \cdot \left( \frac{IM_{as}}{G_a^2} \right) \quad \left\{ \begin{array}{l} a=1,\ldots,N \\ s=1,\ldots,M \end{array} \right.$$

where $$G_a^s = \max_{s=1,M} \{RE_{as}^2 + IM_{as}^2\} \quad a=1,\ldots,N$$

and where $J_a$ is a number of non-zero transfer functions for output device $\alpha$ at a given frequency;

(i) calculating a modified response vector to be used in a first filter weight calculation according to a relationship $$\hat{R1}_k^{as} = \hat{RE}_{as}S_k - \hat{IM}_{as}C_k \text{ for } \left\{ \begin{array}{l} a=1,\ldots,N \\ s=1,\ldots,M \end{array} \right. ;$$

(j) calculating a modified response vector to be used in a second filter weight calculation according to a relationship $$\hat{R0}_k^{as} = \hat{RE}_{as}C_k - \hat{IM}_{as}S_k \text{ for } \left\{ \begin{array}{l} a=1,\ldots,N \\ s=1,\ldots,M \end{array} \right. ;$$

(k) calculating said first and said second filter weights based upon the equations $$W0_{k+1}^a = W0_k^a + \sum_{s=1}^{M} E_k^s \hat{R0}_k^{as} \quad \left\{ \begin{array}{l} a=1,\ldots,N \\ s=1,\ldots,M \end{array} \right.$$

$$W1_{k+1}^a = W1_k^a + \sum_{s=1}^{M} E_k^s \hat{R1}_k^{as} \quad \left\{ \begin{array}{l} a=1,\ldots,N \\ s=1,\ldots,M \end{array} \right.$$

where $E_k^s$ is at least one error signal value;

(l) inputting said first and said second filter weights to said adaptive filter; and (m) outputting a canceling signal to an output device for controlling said disturbance;

thereby causing an adaptation rate which is constant with respect to frequency.

24. A method of controlling a disturbance at at least one selected location which has been generated by a source of disturbance, comprising the steps of:

(a) extracting a signal indicative of tonal characteristics of said source of disturbance;

(b) deriving therefrom said signal indicative a sine wave and a cosine wave;

(c) inputting said sine wave and said cosine wave into an adaptive filter;

(d) calculating a first filter weight $W_1$ and a second filter weight $W_0$ for said adaptive filter according to an algorithm such that said first filter weight $W_1$ and said second filter weight $W_0$ are responsive to at least one error signal;

(e) calculating an output gain G based upon said first filter weight $W_1$ and said second filter weight $W_0$;

(f) reducing at least one of said first filter weight $W_1$ and said second filter weight $W_0$ if said output gain $G > G_{max}$, where said $G_{max}$ is a preselected threshold gain value, such that $G \leq G_{max}$;

(g) inputting said first filter weight $W_1$ and said second filter weight $W_0$ to said adaptive filter to operate on said sine wave and said cosine wave and thereafter recombining said sine wave and said cosine wave for generating a canceling signal; and (h) outputting said canceling signal to an output device for controlling said disturbance at said at least one selected location and where maintaining $G \leq G_{max}$ ensures that said canceling signal exiting from said adaptive filter never exceeds a predetermined saturation limit.

* * * * *